(12) United States Patent
Bruchmann et al.

(10) Patent No.: US 8,708,508 B2
(45) Date of Patent: Apr. 29, 2014

(54) ADAPTIVE DEFORMABLE MIRROR FOR COMPENSATION OF DEFECTS OF A WAVEFRONT

(75) Inventors: Claudia Bruchmann, Jena (DE); Erik Beckert, Arnstadt (DE); Thomas Peschel, Jena (DE); Christoph Damm, Jena (DE); Sylvia Gebhardt, Dresden (DE)

(73) Assignees: Fraunhofer-Gesellschaft zur Foerderung der Angewandten Forschung E.V., Munich (DE); Friedrich-Schiller Universitaet Jena, Jena (DE)

( * ) Notice: Subject to any disclaimer, the term of this patent is extended or adjusted under 35 U.S.C. 154(b) by 105 days.

(21) Appl. No.: 12/933,164

(22) PCT Filed: Mar. 17, 2009

(86) PCT No.: PCT/EP2009/001967
§ 371 (c)(1),
(2), (4) Date: Apr. 7, 2011

(87) PCT Pub. No.: WO2009/115302
PCT Pub. Date: Sep. 24, 2009

(65) Prior Publication Data
US 2011/0222178 A1    Sep. 15, 2011

(30) Foreign Application Priority Data
Mar. 17, 2008  (DE) .......................... 10 2008 014 615

(51) Int. Cl.
*G02B 7/182* (2006.01)
*G02B 5/08* (2006.01)

(52) U.S. Cl.
USPC ........................................ 359/883; 359/846

(58) Field of Classification Search
None
See application file for complete search history.

(56) References Cited

U.S. PATENT DOCUMENTS

| | | | |
|---|---|---|---|
| 3,904,274 | A | 9/1975 | Feinleib et al. |
| 2004/0165243 | A1 | 8/2004 | Helmbrecht |
| 2004/0190110 | A1 | 9/2004 | Greywall |
| 2006/0050421 | A1 | 3/2006 | Ealey |
| 2006/0114585 | A1 | 6/2006 | Ho |
| 2008/0037147 | A1 | 2/2008 | Tanaka et al. |

FOREIGN PATENT DOCUMENTS

| | | |
|---|---|---|
| DE | 4215797 | 11/1993 |
| GB | 2238880 | 6/1991 |
| JP | 200611022 | 1/2006 |
| WO | 2006046078 | 5/2006 |
| WO | 2008077458 | 7/2008 |
| WO | 2009007447 | 1/2009 |

OTHER PUBLICATIONS

International Preliminary Report of Patentability issued in connection with International Application No. PCT/EP2009/001967 mailed on Oct. 14, 2010.
International Search Report and the Written Opinion issued in connection with International Application No. PCT/EP2009/001967, issued on Jun. 26, 2009.

*Primary Examiner* — Jade R Chwasz
(74) *Attorney, Agent, or Firm* — Gesmer Updegrove LLP

(57) ABSTRACT

An adaptive mirror that includes a substrate layer, on the first surface of which a reflecting layer and on the second surface of which at least one actuator is disposed. The substrate layer has a thickness of less than or equal to 1,000 μm and the mirror having at least one further metallization for thermal compensation, as a result of which a thermal deformation of the mirror is avoided or preadjusted such that the desired curvature is set as a function of the reflected power.

30 Claims, 4 Drawing Sheets

US 8,708,508 B2

ADAPTIVE DEFORMABLE MIRROR FOR COMPENSATION OF DEFECTS OF A WAVEFRONT

PRIORITY INFORMATION

Figure 1:
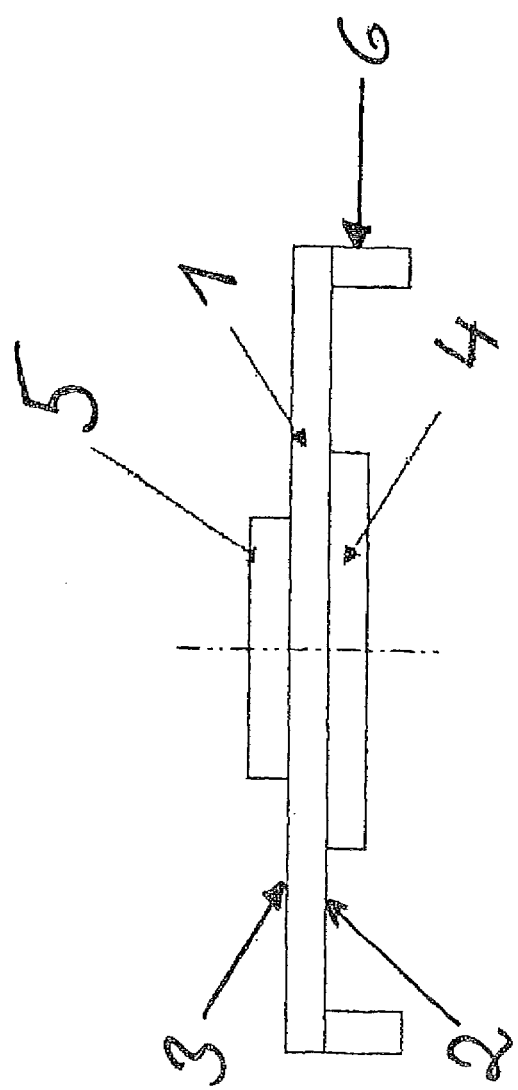

The present invention is a 371 National Phase Application of International Application No. PCT/EP2009/001967, filed on Mar. 17, 2009, that claims priority to German Application No. DE 102008014615.3, filed on Mar. 17, 2008. Both applications are incorporated herein in their entireties.

BACKGROUND OF THE INVENTION

The present invention relates to the production of an adaptive deformable mirror for compensation of defects of a wavefront.

Adaptively deformable mirrors are used in various fields of optics, thus e.g. in terrestrial or extraterrestrial applications but also in experiments with electromagnetic radiation with high power, as is emitted by high-power lasers and/or high-power laser processes or in experiments with low or extreme ultraviolet radiation.

In particular for use with low or extreme ultraviolet radiation, various embodiments of adaptive mirrors have been developed. The basic idea resides in a mirror surface being deformed by means of actuators such that defects in an incident wavefront can be compensated for. The actuators can act, on the one hand, perpendicular to the mirror layer and, on the other hand, can be applied in the form of layers. According to the field of application, the thickness of the mirror layer and/or of the actuators or of the active layer can be varied over the diameter of the adaptive mirror. By varying the thickness of the active layer, different forces can be adjusted for the deformation of the mirror substrate as a function of the radial position. The change in layer thickness is thereby effected continuously and constantly. Because of the high power of the incident radiation and the absorption thereof, the result can be deformations of the mirror layer. One possibility for avoiding such undesired deformations is offered by an adaptive mirror, the mirror frame of which, consisting of the same material as the layer on which the mirror surface is applied, acts as heat sink and hence cools the mirror membrane. Furthermore, adaptive mirrors have been proposed, the curvature of which is variable and which hence can be used in various fields of application.

The previous state of the art demands high manufacturing and mounting complexity in order to connect the actuators or the active layers correspondingly to the mirror surface and/or in order to produce permanently the desired curvature of the mirrored layer. Furthermore, because of the large layer thickness of the mirror surface, the result is thermal deformations which are caused by the high power of the incident radiation. These thermal deformations must then be compensated for in conventional adaptive mirrors with the help of the actuators, in addition to the defects in the wavefront, which makes the precise compensation of defects in the wavefront difficult.

SUMMARY OF THE INVENTION

It is hence the aim of the invention to make available an adaptive mirror and also a method for the production thereof, which can be manufactured simply and the construction of which does not allow or only in a limited fashion thermal deformation due to the high power of the incident radiation.

The above-mentioned objects are achieved by the adaptive mirror indicated in claim 1. Advantageous embodiments of the adaptive mirror according to the invention are provided in the respective dependent claims. The production of the adaptive mirror is effected according to the invention according to claim 25 and also in the advantageous embodiments thereof according to the associated dependent claims.

The adaptive mirror according to the invention, in its simplest form, consists of a thin substrate layer, on the first surface of which a reflective layer is applied and the second surface of which is connected to at least one actuator. According to the invention, the substrate layer has a thickness of less than or equal to 1,000 μm. Such a small thickness of the substrate layer is necessary in order to avoid or at least to minimise thermal deformations due to the high power of the incident radiation. Since the heat expansion is proportional to the substrate thickness, the result, from the condition that the thickness of the substrate layer is 1,000 μm or less, is merely a small thermal deformation. Furthermore, the heat expansion coefficients of the materials used for the reflecting layer and the substrate layer are coordinated. Thermal deformations which nevertheless result are of such small dimensions that they can easily be compensated for by means of the actuators.

In order to further minimise thermal deformations, a substrate layer which has a thickness dependent upon the substrate and the modulus of elasticity thereof is advantageous. For example, the thickness with $Al_2O_3$ is at most 500 μm, with LTCC at most 400 μm and with silicon at most 700 μm. Furthermore, the thickness of the substrate layer is intended to be greater than or equal to 50 μm, preferably greater than or equal to 100 μm, in order to ensure a certain stability of the layer. The substrate layer and hence the entire adaptive mirror has a diameter in the range of 25 mm to 150 mm, in particular however in the range of 50 mm to 100 mm or 50 mm to 70 mm. The dimensions of the adaptive mirror used are based on the type of application and the substrate.

Ceramic materials are preferably used as materials for the substrate layer. Preferably, various glass ceramics are used, such as for example low temperature co-fired ceramics (LTCC), aluminum oxide ceramics ($Al_2O_3$), aluminum nitride ceramics (AlN), zirconium oxide ($ZrO_2$), cordierite materials and variants based thereon with low thermal expansion coefficients, titanium silicate glass, such as for example ULE, and further glass ceramics with very low thermal expansion coefficients, such as for example Clearceram-Z by the company Ohara, Zerodur by the company Schott AG and/or Astrosital. With respect to the composition of Clearceram-Z, reference is made to U.S. Pat. No. 5,591,682 and the disclosure content thereof in this respect is adopted. There should be understood by low temperature co-fired ceramics, for example green foils consisting of $Al_2O_3$ with a glass proportion up to 50% and organic binders which are laminated on each other and subsequently sintered. There are possible as cordierite materials, Low CTE Cordierite™ Based thereon, for example magnesium aluminium silicates with the simplified approximation of the composition of pure ceramic cordierite which comprises defined components of MgO, $Al_2O_3$ and $SiO_2$ can be used. The proportions can be divided for example into 14% MgO, 35% $Al_2O_3$ and 51% $SiO_2$.

Furthermore, silicon and glass materials, such as silica glass and/or polycrystalline diamond, which can be produced for example by means of chemical gas phase deposition can be used. Likewise, DCB substrates (direct copper bonded) can be used as substrate layer. Of concern thereby are materials which are already metallised on their front- and also on their rear-side. Thus, a copper layer can be bonded for example on an aluminum oxide ceramic and/or an aluminum nitride ceramic. Such products can be obtained from the company Electrovac curamik GmbH. The metallisation can serve later as mirror layer and/or as electrode for the actuators.

Preferably, the reflecting layer has a thickness between 10 μm and 200 μm. Preferably the thickness is however between 20 μm and 100 μm, in particular however between 40 μm and 60 μm. In order to avoid in turn thermal deformations due to high power of the incident radiation, as small a thickness as possible is an option in the case of the reflecting layer.

There are possible as materials for the reflecting layer, preferably metals and/or semimetals, in particular, copper, nickel, nickel phosphorus, gold, tungsten, molybdenum, titanium, silicon and/or alloys thereof. According to the choice of material, the reflecting layer is deposited on the substrate layer galvanically and/or chemically and/or applied via screen printing processes. In individual cases, reflecting layer and substrate layer can be bonded to each other, thus for example if silicon is bonded to a low temperature co-fired ceramic (black silicon on LTCC).

Preferably, the heat expansion coefficient of the reflecting layer, if the latter comprises for example metallic materials, is greater than or equal to the heat expansion coefficient of the substrate. If in contrast the reflecting layer comprises for example silicon and the substrate layer LTTC, then it can result that the heat expansion coefficient of the reflecting layer is less than or equal to the heat expansion coefficient of the substrate or the heat expansion coefficients of substrate and reflecting layer and/or actuator layer are adapted to each other.

Preferably, not only one actuator but also a plurality of actuators is used for compensation of defects in wavefronts. These actuators can be disposed one above the other and/or adjacently, for example as a multilayer thick layer or as single- or multilayer discs. The number of superimposed actuators can thereby vary over the diameter of the adaptive mirror according to the invention. By means of such an arrangement of the actuators, the mirror surface can be deformed at various places to a different degree via a different force input onto the mirror surface, correspondingly the defect of the incident wavefront. The individual actuators can preferably be constructed from an active layer (actuator layer), on the front- and also rear-side of which electrically conductive layers which serve as electrodes are applied. These electrically conductive layers are thin relative to the active layer and have a greater heat expansion than this. The electrically conductive layers are applied on the active layer by means of screen printing, adhesion or soldering processes.

There are used as materials for the active layer of the actuators, preferably piezoelectric materials. Furthermore however, also ferroelectric materials, magnetostrictive materials and/or electrostrictive materials, but also shape memory alloys and/or other suitable materials can be used.

The electrically conductive layers should preferably be structured into partial electrodes in order to be able to be correspondingly actuated. According to the defect of the wavefront, the adaptive mirror must be deformed at different places so that the individual actuators or individual areas of the active layer must be actuated independently of each other via the partial electrodes.

The partial electrodes on the respective active layer can be disposed in any way. Advantageously, there are possible a honeycomb-shaped or else a cake-shaped arrangement. Also a regular arrangement of square partial electrodes would be conceivable.

The active layer preferably has a thickness between 50 μm and 300 μm, in particular a thickness between 80 μm and 150 μm.

The reflecting layer is preferably made of a metallic starter layer which preferably has gold, copper, nickel, silver, palladium, titanium and/or aluminum and is sputtered onto the substrate layer, and also a galvanically or chemically deposited reflecting layer. On the other hand, the reflecting layer can however also be bonded to the substrate layer or be applied via screen printing processes.

The reflecting layer can consist of a reflective metal mirror. Likewise, the reflective layer can consist of a reflective metal mirror having an additional multilayer layer which increases the degree of reflection. A further variant provides that the reflecting layer consists of a reflective metal mirror with an additional dielectric layer which increases the degree of reflection and lowers the degree of absorption.

The reflecting layer applied on the substrate is structured, for its part, in optical quality by means of diamond machining. The reflecting layer, on the one hand, is thereby ground correspondingly smoothly for optical applications and, on the other hand, the reflecting layer is possibly provided with a curvature. However, planar reflecting layers can also be used.

Furthermore, the reflecting layer is coated with a highly reflecting layer sequence in order to obtain as high a degree of reflection as possible.

It is further preferred that the adaptive mirror has at least one further metallisation which serves for thermal compensation. As a result, a thermal deformation of the adaptive mirror is avoided or preadjusted such that the desired curvature is set as a function of the reflected power. Such metallisations are integrated in the mirror at any position. Thus the metallisations can be disposed between individual substrate layers, in particular ceramic layers, or on the second surface, i.e. above the piezoelectric actuator. There are possible for the metallisation, preferably metals and/or semimetals, in particular copper, nickel, nickel phosphorus, gold, tungsten, molybdenum, titanium, silicon and/or alloys thereof. The additional metallisations can be deposited galvanically and/or chemically or be applied by screen printing processes.

The frames of the mirrors preferably consist of the same material as the respective substrate layer and can be structured in order to achieve increased flexibility and hence increased deflection.

In order to produce the adaptive mirror, a reflecting layer is applied on a first surface of the substrate layer, the thickness of which, according to the invention, is at most 1,000 μm, on a second surface of the substrate layer, one or more actuators.

Before applying the reflecting layer, preferably a metallic starter layer is firstly sputtered on. On the metallic starter layer, a reflecting layer is deposited galvanically or chemically. In order to start the deposition, the starter layer can be seeded for example with palladium or the deposition can be initiated by a short current impulse. During cooling of the deposited layer from the deposition temperature to room temperature, the result is thermal deformation which can turn out concavely or convexly according to the thermal expansion coefficient of reflecting layer and substrate layer. Since preferably the thermal expansion coefficient of the reflecting layer is greater than that of the substrate layer, the result is preferably a concave deformation. The respective deformation is structured in a planar manner or with curvature corresponding to the respective application by means of diamond machining.

A further possibility for applying the reflecting layer on the substrate layer resides in both layers being connected to each other by bonding. This process relates for example to the connection of LTCC as substrate layer and silicon as reflecting layer. Alternatively, a DCB layer can be used from the beginning as substrate layer.

After application of the reflecting layer on the substrate layer, the reflecting layer can be structured in optical quality by means of diamond machining. Subsequently, the reflecting layer can also be coated with a highly reflective layer sequence.

The highly reflective layer sequence preferably comprises dielectric materials. The actuator or actuators are preferably applied with the help of screen printing methods, adhesive methods and/or soldering methods.

DETAILED DESCRIPTION OF THE ILLUSTRATED EMBODIMENTS

Figure 2:
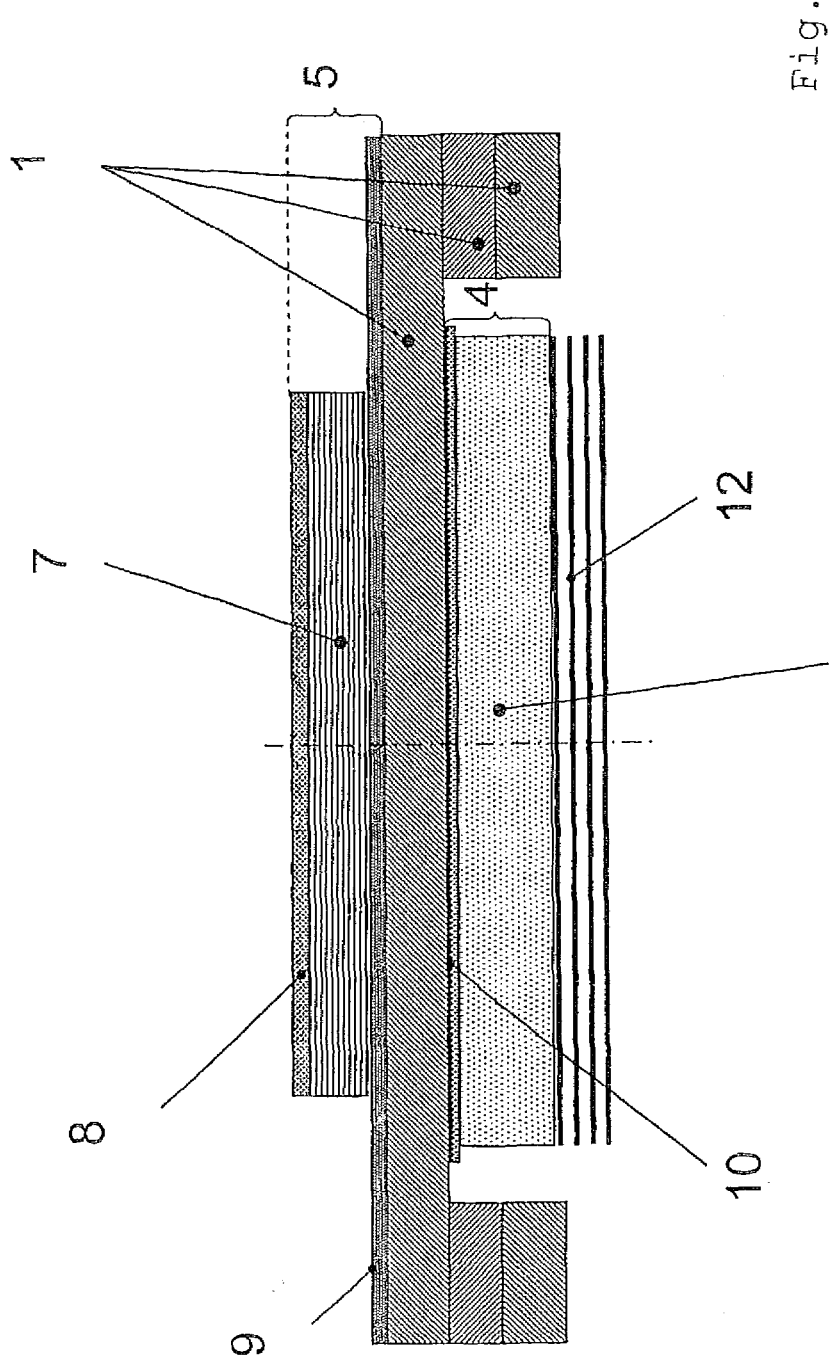

A few examples of adaptive mirrors and arrangements according to the invention are provided in the following. There are shown:

FIG. 1 a basic construction of an adaptive mirror according to the invention,

FIG. 2 a construction of an embodiment of an adaptive mirror according to the invention, and FIG. 3A-3D a plan view on an adaptive mirror with various actuation methods via differently disposed partial electrodes.

FIG. 1 shows the cross-section through an adaptive mirror as is described in the present invention. The same or similar reference numbers here thereby describe the same or similar elements in the following Figures.

The adaptive mirror is constructed from a substrate layer 1 which is at most 1,000 μm thick, on the first surface 2 of which a reflecting layer 4 and on the second surface 3 of which at least one actuator 5 is applied. At the edges of the substrate layer 1 on the first surface 2 thereof, a mounting 6 is fitted and has for LTCC the same material as the substrate layer. In the case of other substrate materials, also materials different from the substrate material can be used for the mounting.

FIG. 2 shows in turn a cross-section through an adaptive mirror which corresponds however to a preferred embodiment. Again, the adaptive mirror is constructed from a substrate layer 1 made of LTCC, a reflecting layer 4 and at least one actuator 5. The actuator here is constructed from an active layer 7 made of a piezoelectric material, which layer is situated between two electrically conductive layers, namely a cover electrode 8 and a base electrode 9 which is situated between the active layer 7 and the substrate layer 1. The cover electrode 8 and/or the active layer 7 can be structured corresponding to FIG. 3. The reflecting layer 4 is also constructed from two components, namely a sputtered-on metallic starter layer 10 and a galvanically or chemically deposited layer 11. The reflecting layer 4 can furthermore be coated with a highly reflective layer sequence made of preferably dielectric materials.

Figure 3A:
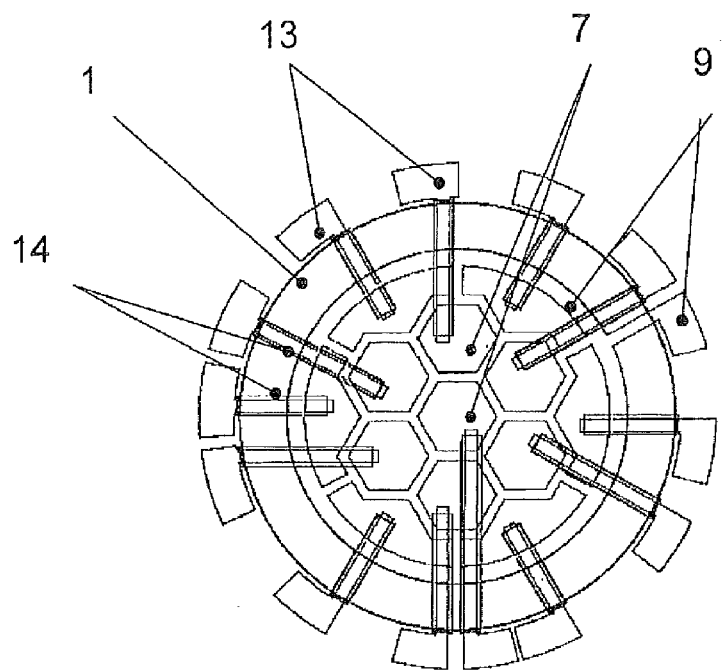
Figure 3B:
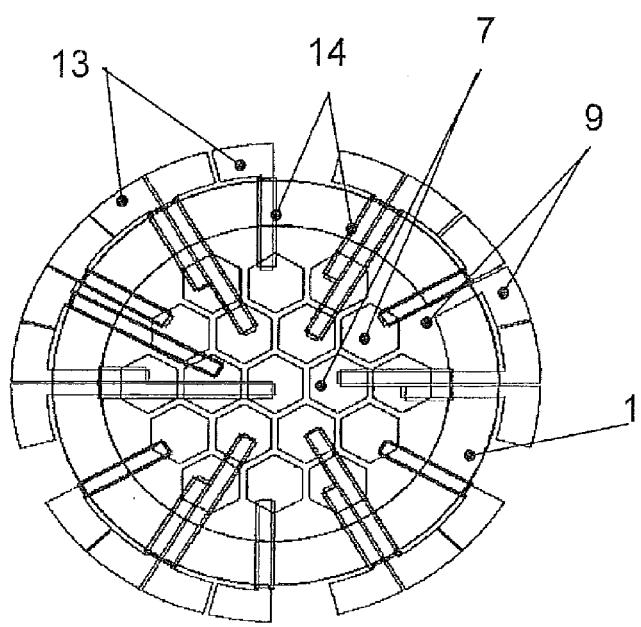

FIG. 3A shows a plan view on an adaptive mirror. The substrate layer 1 is detected in a circular shape. Situated thereabove is a base electrode 9 above which an active layer 7 which is made of piezoelectric material and is structured in a honeycomb shape is situated. These honeycomb-shaped active layer parts 7 can be actuated via contacts 13. Since for precise actuation each honeycomb-shaped part of the active layer 7 is intended to be actuated individually, each individual contact 13 is insulated via passivations 14 from the parts of the active layer 7 which it is not intended to actuate. FIG. 3B differs from FIG. 3A by the cover electrode, in comparison with FIG. 3A, being structured into smaller honeycomb-shaped parts and the active layer not being structured. FIG. 3D also shows merely the difference, relative to FIGS. 3A and 3B, that the active layer 7 is not subdivided in a honeycomb shape but in a cake shape.

Figure 3C:
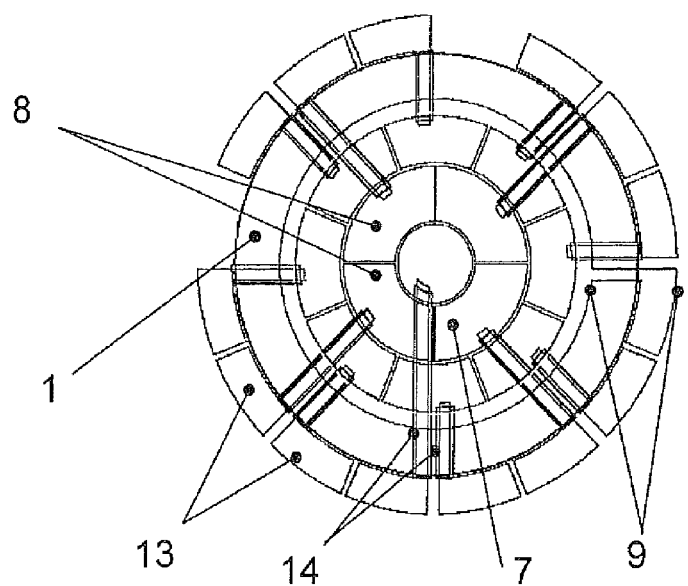
Figure 3D:
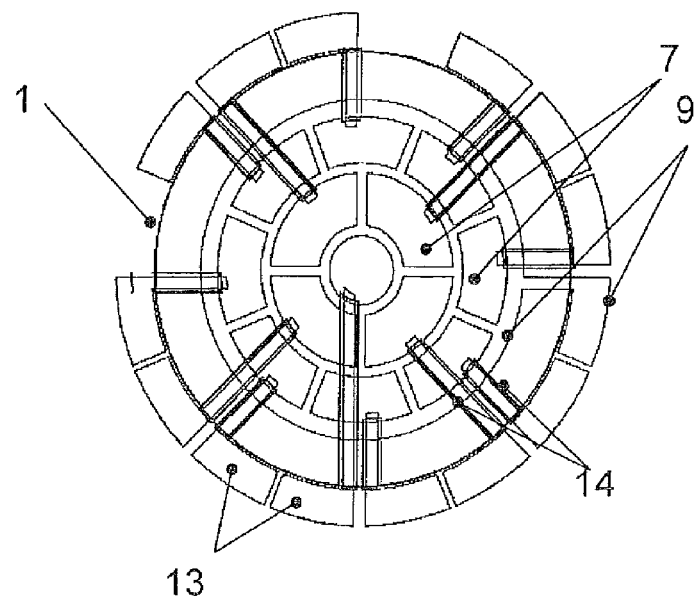

In FIG. 3C, a circular substrate layer 1 is detected, above which in turn the base electrode 9 is situated. Situated thereabove is an unstructured active layer 7 made of piezoelectric material. Thereabove, a cake-shaped structured cover electrode 8 is situated which is actuated via contacts 13 which are provided with passivations 14.

In the following, also the production of an electroless-deposited nickel-phosphorus layer with phosphorus contents above 10.5% on metallised LTCC substrates is intended to be explained. The thickness of the nickel-phosphorus layer is intended to be above 25 μm since this is necessary for a UP machining.

An LTCC substrate with a diameter of 40 mm and a thickness of 150 μm is used as substrate. The metallised surface is intended to have a dimension of 7 cm$^2$. The starter layer, a metallisation for example made of gold, is intended to have a diameter of 30 mm.

Hessonic HP-6 by Dr. Hesse GmbH & CIE KG was selected as electrolyte for the electroless deposition of a nickel-phosphorus alloy.

Firstly, 1 l of the electrolyte Hessonic HP-6 is prepared according to specifications and heated to 90° C. Thereafter, the nickel content is set to 5.4 g/l and the pH value to 5.1. Subsequently, the LTCC substrate is incorporated in a PMMA mounting provided for this purpose and subsequently degreased with isopropanol and rinsed with deionised water. In order to activate the metallised surface, this is immersed in 30% nitric acid for 2 minutes and thereafter is rinsed again with deionised water.

Pre-treated in this way, the mounted substrate is thus suspended in the heated electrolyte such that the surface to be coated points diagonally downwards. The reaction is started with the help of an iron bar. A magnetic bar agitator ensures the bath movement at a speed of rotation of 130 rpm. A movement of the item is not effected. After 2.5 hours, the substrate is taken out of the electrolyte, cooled slowly to room temperature and removed from the mounting. The layer thickness is 25 μm.

The present invention therefore makes available an adaptive mirror which is used for compensation of defects in wavefronts. The adaptive mirror according to the invention is suitable above all for applications with high-power lasers and/or high-power fibre lasers since, as a result of low thickness, merely low thermal deformations can result. Hence the actuators must compensate essentially only for the defects of the wavefront per se and not the thermal deformations.

What is claimed is:

1. An adaptive mirror having a substrate layer, on the first surface of which a reflecting layer and on the second surface of which at least one actuator is disposed, wherein the substrate layer having a thickness of less than or equal to 1,000 μm and the mirror having at least one further metallization layer that provides thermal compensation, as a result of which a thermal deformation of the mirror is avoided or preadjusted by said metallization layer, wherein the desired curvature of said mirror is a function of the reflected power, said metallization layer comprises metals.

2. The adaptive mirror according to claim 1, wherein the substrate layer, as a function of the substrate material, has a thickness of 100 μm to 500 μm in the case of $Al_2O_3$, of 90 μm to 400 μm in the case of LTCC or of 300 μm to 800 μm in the case of silicon.

3. The adaptive mirror according to claim 1, wherein its diameter is greater than 25 mm, or greater than 50 mm, and/or less than 150 mm, or less than 100 mm.

4. The adaptive mirror according to claim 1, wherein the at least one further metallization layer is integrated in the substrate layer or is disposed on the second surface.

5. The adaptive mirror according to claim 1, wherein the substrate layer comprises ceramic materials, or glass ceramics, LTCC ceramics, aluminium oxide ceramic ($Al_2O_3$), aluminium nitride ceramic (AlN), green foils made of $Al_2O_3$ powder and organic binders, zirconium oxide ($ZrO_2$), cordierite materials, Clearceram-Z, or Astrositai, titanium silicate glass and lithium-aluminosilicate glass ceramics, and/or silicon and glass materials, or silica glass, and/or polycrystalline diamond or consists of one or more of these materials.

6. The adaptive mirror according to claim 1, wherein the reflecting layer has a thickness between 10 μm and 200 μm preferably between 20 μm and 100 μm, particularly preferred between 40 μm and 60 μm.

7. The adaptive mirror according to claim 1, wherein the reflecting layer has a layer made of metallic materials, or, copper, nickel, nickel phosphorus, gold, silver, tungsten, molybdenum, titanium, silicon and/or alloys thereof.

8. The adaptive mirror according to claim 1, wherein the heat expansion coefficient of the reflecting metallic layer is greater than the heat expansion coefficient of the substrate layer.

9. The adaptive mirror according to claim 1, wherein two or more actuators are disposed adjacently and/or one above the other.

10. The adaptive mirror according to claim 1, wherein the number of superimposed actuators can vary over the diameter of the adaptive mirror.

11. The adaptive mirror according to claim 1, wherein each individual actuator is constructed in such a manner that an actuator layer is disposed between two electrically conductive layers which are thin relative to the actuator layer.

12. The adaptive mirror according to claim 11, wherein the actuator layer comprises a piezoelectric material and/or a ferroelectric material and/or a magnetostrictive material and/or an electrostrictive material and/or shape memory alloys and/or other suitable materials or consists of one or more of these materials.

13. The adaptive mirror according to claim 11, wherein the electrically conductive layers are structured into partial electrodes.

14. Adaptive mirror according to claim 13, wherein the partial electrodes are disposed in a honeycomb shape or in a cake shape, in a square or by a combination of these geometric shapes.

15. The adaptive mirror according to claim 11, wherein a single actuator layer has a thickness between 50 μm and 300 μm, or a thickness between 80 μm and 150 μm.

16. The adaptive mirror according to claim 1, wherein a starter layer is sputtered onto the substrate layer.

17. The adaptive mirror according to claim 16, wherein the reflecting layer deposited galvanically or chemically or applied via screen printing processes is coated with a highly reflective layer sequence.

18. The adaptive mirror according to claim 1, wherein a reflecting layer is deposited galvanically or chemically on the sputtered-on starter layer or is applied via screen printing processes.

19. The adaptive mirror according to claim 18, wherein the reflecting layer deposited galvanically or chemically or applied via screen printing processes is structured in optical quality.

20. The adaptive mirror according to claim 1, wherein the mirror surface can be configured to be planar or with a curvature.

21. A method for the production of an adaptive mirror, a reflecting layer being applied on a first side of a substrate layer and at least one actuator being applied on a second side of this substrate layer, wherein the substrate layer having a thickness of less than or equal to 1,000 μm and at least one further metallization layer that provides thermal compensation, as a result of which a thermal deformation of the mirror is avoided or preadjusted by said metallization layer, wherein the desired curvature of said mirror is a function of the reflected power, said metallization layer comprises metals.

22. The method according to claim 21, wherein the adaptive mirror is produced.

23. The method according to claim 21, wherein a starter layer is sputtered onto the first surface of the substrate layer.

24. The method according to claim 21, wherein a reflecting layer is deposited galvanically or chemically on the sputtered-on starter layer.

25. The method according to claim 21, wherein the substrate layer and the reflecting layer are connected to each other by bonding.

26. The method according to claim 21, wherein a reflecting layer is applied via screen printing processes.

27. The method according to claim 21, wherein the reflecting layer is structured in optical quality by means of diamond machining after application on the substrate layer.

28. The method according to claim 21, wherein the reflecting layer is coated with a highly reflective layer sequence which comprises dielectric materials or consists thereof.

29. The method according to claim 21, wherein the actuator or actuators are applied by means of screen printing processes and/or adhesion processes and/or soldering processes.

30. The method according to claim 21, wherein the electrically conductive layers are applied by means of screen printing processes and/or adhesion processes and/or soldering processes.

* * * * *